United States Patent
Greeley

(10) Patent No.: US 7,668,509 B2
(45) Date of Patent: Feb. 23, 2010

(54) FREQUENCY SELECTIVE LEVELING LOOP FOR MULTI-SIGNAL PHASED ARRAY TRANSMITTERS

(75) Inventor: John S Greeley, Ambler, PA (US)

(73) Assignee: Sensor and Antenna Systems, Lansdale, Inc., Baltimore, MD (US)

( * ) Notice: Subject to any disclaimer, the term of this patent is extended or adjusted under 35 U.S.C. 154(b) by 779 days.

(21) Appl. No.: 10/949,046

(22) Filed: Sep. 24, 2004

(65) Prior Publication Data

US 2006/0068707 A1   Mar. 30, 2006

(51) Int. Cl.
H04B 1/00 (2006.01)
H04B 15/00 (2006.01)
(52) U.S. Cl. .......................... 455/42; 455/502; 455/503
(58) Field of Classification Search ................. 455/502, 455/503
See application file for complete search history.

(56) References Cited

U.S. PATENT DOCUMENTS

| | | | | |
|---|---|---|---|---|
| 5,418,818 A | * | 5/1995 | Marchetto et al. | 375/264 |
| 5,590,403 A | * | 12/1996 | Cameron et al. | 455/503 |
| 5,634,198 A | * | 5/1997 | Cameron et al. | 455/63.1 |
| 5,850,610 A | * | 12/1998 | Testani et al. | 455/512 |
| 6,055,431 A | | 4/2000 | Dybdal | |
| 6,212,479 B1 | | 4/2001 | Shoulders et al. | |
| 6,266,536 B1 | * | 7/2001 | Janky | 455/503 |
| 6,366,622 B1 | * | 4/2002 | Brown et al. | 375/322 |
| 6,470,188 B1 | * | 10/2002 | Ohtani et al. | 455/503 |
| 6,600,438 B2 | * | 7/2003 | Hilton | 341/155 |
| 7,058,034 B2 | * | 6/2006 | Pekonen | 370/331 |
| 7,058,422 B2 | * | 6/2006 | Learned et al. | 455/526 |
| 7,099,654 B1 | * | 8/2006 | Tewfik | 455/410 |
| 2002/0048326 A1 | * | 4/2002 | Sahlman | 375/297 |
| 2003/0161290 A1 | * | 8/2003 | Jesse et al. | 370/338 |
| 2005/0281063 A1 | * | 12/2005 | Sointula | 363/63 |
| 2006/0071853 A1 | * | 4/2006 | Sayers | 342/432 |
| 2006/0209992 A1 | * | 9/2006 | Tomita | 375/334 |
| 2007/0184862 A1 | * | 8/2007 | Hartless | 455/503 |

* cited by examiner

*Primary Examiner*—Matthew D Anderson
*Assistant Examiner*—Bobback Safaipour
(74) *Attorney, Agent, or Firm*—Jaeckle, Fleischmann & Mugel, LLP

(57) ABSTRACT

A frequency selective leveling loop that performs phase and amplitude control of multiple signals within a phased array structure is disclosed. The leveling loop sensor components are embedded into the array structure. The frequency selective leveling loop can be used with multiple signal amplifiers, and a conventional phase array jamming system can be used to radiate multiple signals simultaneously. The conversion of phase information to baseband eliminates the need for phase matched cables. The frequency selective leveling that is enabled is tolerant of multiple signals and provides the individual signal phase and amplitude feedback by utilizing analytic sampling.

18 Claims, 5 Drawing Sheets

US 7,668,509 B2

FREQUENCY SELECTIVE LEVELING LOOP FOR MULTI-SIGNAL PHASED ARRAY TRANSMITTERS

FIELD OF THE INVENTION

The invention relates to phased array transmitters, and more particularly, to a frequency selective leveling loop for multi-signal phased array transmitters.

BACKGROUND OF THE INVENTION

A phased array is a group of antenna elements in which the relative phases of respective signals feeding the antenna elements are varied to coordinate radiation patterns of the array so that the radio wave signals are reinforced in certain directions and suppressed in others. The relative amplitudes of the signals, as well as the constructive and destructive interference effects among the signals radiated by the individual antenna elements, determine the effective radiation pattern of the array.

A phased array may be used to point a fixed radiation pattern, or to scan rapidly in azimuth or elevation. Transmitters utilizing phased array techniques have been implemented successfully for many years. Common applications for phase arrays include, for example, narrow band military radar systems.

More recently, the capability of phased array techniques has gradually extended to include wide band, multi-signal, multi-polarization military jammers. However, the feed network and support electronics for this type of jammer is complex and contains a large number of individual hardware elements including multiple amplitude adjust modules, time delay modules, phase shift modules, and signal couplers. This is because conventional phased array architectures separate signal generation, beam forming and signal polarization functions.

Most recently, an additional requirement of phased arrays includes the ability to independently steer individual beams for each signal. Adding this capability further increases the system complexity by nearly the number of signal beams. In particular, a phase-locked multi-signal exciter must be coupled to each antenna array element. As such, the system implementation with conventional phased array architectures approaches a practical limit that precludes extending the architecture to more than a hand full of radio wave signals.

Consider, for example, the multiple amplitude adjust modules that are required in a phased array. Conventional multi-signal RF output amplitude control is implemented using "open loop" techniques that require complex factory calibration tables to compensate for known amplitude and phase distortion in the RF power amplifiers associated with each antenna element. Without phase control feedback, the beam steering phase shifters must be complex true time delay (TTD) in order to achieve a wide RF bandwidth. Such an "open loop" approach results in imperfect antenna beam steering, and may also require frequent re-calibration due to system hardware maintenance repair or other changes to the factory-calibrated system.

In addition, conventional RF leveling loops cannot be effectively extended to multi-signal systems. Instead, RF leveling loops provide minimal effectiveness and are used more to protect amplifiers from damage than to optimize RF performance and efficiency. For instance, if there is more than one signal present or a strong interfering signal, a conventional RF leveling loop can level on the wrong signal. This can result in unnecessary power reduction and loss in efficiency.

In short, conventional phased array beam forming techniques and RF leveling loop architectures are relatively large, require a substantial number of components, require complex factory calibration, and provide limited RF performance and efficiency.

What is needed, therefore, are phase array techniques and leveling loop architectures that provide enhanced RF performance and efficiency relative to conventional techniques and architectures.

BRIEF SUMMARY OF THE INVENTION

One embodiment of the present invention provides a frequency selective leveling loop device for multi-signal phased array transmitters. The device includes a multi-signal exciter that is adapted to process a plurality of exciter signals, and to sum the exciter signals thereby forming a composite signal. An I and Q down converter is adapted to convert a sample of the composite signal to I and Q signals. In particular, the composite signal is mixed with an amplitude limited exciter signal sample, thereby providing two mixed outputs that each include a number of AC signals and a DC component. A digital low pass filter is adapted to remove the AC signals from the mixed outputs leaving only the DC component, thereby enabling at least one of amplitude leveling and steering of each signal in an independent beam. Note that the I and Q DC signal components together describe both the amplitude and phase of an individual signal.

The device may further include an RF power amplifier that is adapted to amplify the composite signal. The device may further include a sampling coupler that is adapted to provide the amplified composite signal to an antenna element for transmission, and to provide the sample of the composite signal. In one particular such embodiment, the RF power amplifier and the sampling coupler are configured to provide an overall unity gain. The device may further include an I and Q to signal amplitude and phase angle converter adapted to convert the DC component to amplitude and phase angle of the composite signal sample.

The device may further include a time multiplexed signal sample and amplitude limiter adapted to sequentially sample exciter signals, thereby providing the amplitude limited exciter signal sample. The device can be implemented, for example, as one of an integrated circuit chip or chip set. The low pass filter can be variable in bandwidth, to accommodate a plurality of signal situations.

Another embodiment of the present invention provides a frequency selective leveling loop device for multi-signal phased array transmitters. The device includes a multi-port exciter that is adapted to process a plurality of exciter signals and to sum the exciter signals, thereby forming a composite signal. An RF power amplifier is adapted to amplify the composite signal. A sampling coupler is adapted to provide the amplified composite signal to an antenna element of the phased array for transmission, and to provide the sample of the composite signal. A time multiplexed signal sample and amplitude limiter module is adapted to sequentially sample exciter signals, thereby providing an amplitude limited exciter signal sample. An I and Q down converter is adapted to convert a sample of the composite signal to I and Q signals. In particular, the composite signal is mixed with the amplitude limited exciter signal sample, thereby providing two mixed outputs that each include a number of AC signals and a DC component. A digital low pass filter is adapted to remove the AC signals from the mixed outputs leaving only the DC component. An I and Q to signal amplitude and phase angle converter is adapted to convert the DC component to amplitude and phase angle of the composite signal sample, thereby enabling at least one of amplitude leveling and steering of each signal in an independent beam.

Another embodiment of the present invention provides an I/Q phase and amplitude sensor for a frequency selective leveling loop for multi-signal phased array transmitters. The sensor includes an I and Q down converter adapted to convert a sample of a composite signal including a number of exciter signals to I and Q signals, by mixing the composite signal with an amplitude limited exciter signal sample, thereby providing two mixed outputs that each include a number of AC signals and a DC component.

The composite signal can be provided, for instance, by a multi-signal exciter adapted to process a plurality of exciter signals and to sum the exciter signals, thereby forming the composite signal. The composite signal can also be amplified and provided to an antenna element for transmission. The sensor may further include a digital low pass filter that is adapted to remove the AC signals from the mixed outputs leaving only the DC component, thereby enabling at least one of amplitude leveling and steering of each signal in an independent beam. The low pass filter can be variable in bandwidth to accommodate a plurality of signal situations.

The sensor may further include an I and Q to signal amplitude and phase angle converter that is adapted to convert the DC component to amplitude and phase angle of the composite signal sample. The sensor may further include a time multiplexed signal sample and amplitude limiter that is adapted to sequentially sample exciter signals, thereby providing the amplitude limited exciter signal sample. The sensor can be implemented, for example, as one of an integrated circuit chip or chip set.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Embodiments of the present invention provide an I/Q phase and amplitude sensor for a frequency selective leveling loop for multi-signal phased array transmitters. The frequency selective leveling loop can thus perform phase and amplitude matching of multiple signals within a phased array structure. The leveling loop sensor components are embedded into the array structure. The frequency selective leveling loop can be used with multiple signal amplifiers, and a conventional phase array jamming system can be used to radiate multiple signals simultaneously. The conversion of phase information to baseband eliminates the need for phase matched cables.

The frequency selective leveling that is enabled is tolerant of multiple signals and provides the individual signal phase and amplitude feedback by utilizing analytic sampling. In high gain phased arrays, the precise measurement of phase and amplitude ensures that the antenna beam is sharp and that unwanted radiation is suppressed. Thus, a broadband synchronous detector or "RF sampler" is enabled for rapid multiplexing and measuring of many signals.

Phased Array

Figure 1:
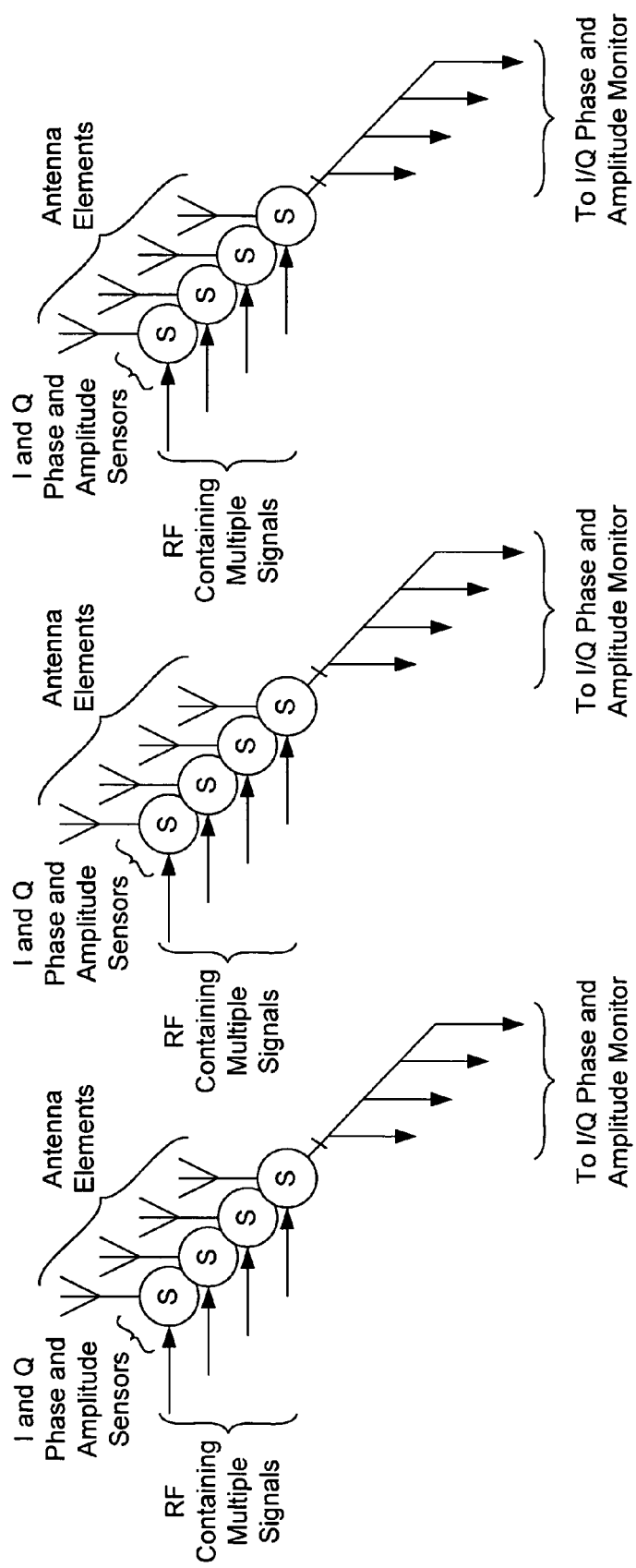
FIG. 1 illustrates a phased array system configured in accordance with an embodiment of the present invention.

FIG. 1 illustrates a phased array system configured in accordance with an embodiment of the present invention.

As can be seen, the system includes a number of I/Q phase and amplitude sensors (S), each coupled to an antenna element of a phased array. The sensors are configured to receive the output of each element amplifier (not shown), so that RF containing multiple signals can be detected. The sensors perform direct I-Q conversion to DC by using a limited version of each signal to be detected. Note the placement of the leveling detector in the phased array system at the antenna feed point.

A feedback loop can be provided to monitor the phase and amplitude of each element of a multi-signal phased array transmitter. Through feedback and the use of attenuators and TTD phase shifters, the antenna beam can be focused and steered by adjusting RF phase through phase shift. Individual signals are controlled at the exciter level.

RF Sampler

Figure 2:
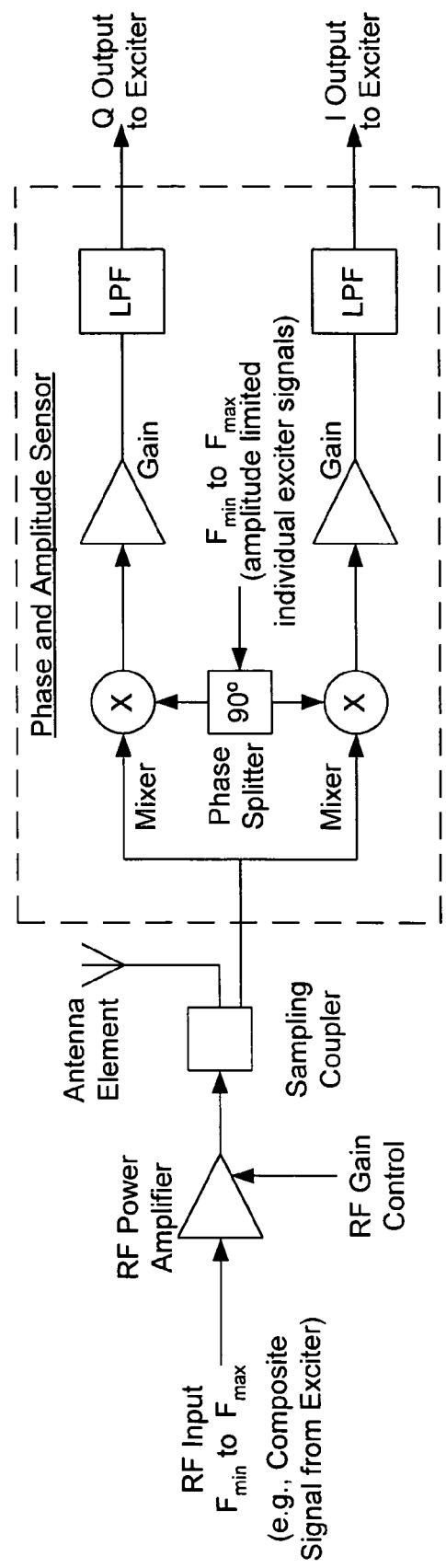
FIG. 2 illustrates a block diagram of an I/Q phase and amplitude sensor configured in accordance with an embodiment of the present invention.

FIG. 2 illustrates a block diagram of an I/Q phase and amplitude sensor configured in accordance with an embodiment of the present invention. The sensor measures one signal at a time. Note that the reference here to one signal at a time refers to the time multiplexed nature of the leveling loop. Although the leveling loop performs leveling and phase control on all signals simultaneously and continuously, the underlying error phase/amplitude measurement is a time multiplexed sample at a very high rate.

The complex signal ($F_{min}$ to $F_{max}$), which in this case is a composite of exciter signals, is amplified (by the RF power amplifier) and provided to the antenna element for transmission. A sample of the composite signal is provided by the sampling coupler, and is provided to the input of the phase and amplitude sensor. The sensor converts the sample signal to its real and imaginary components for both I and Q channels using a 90° hybrid and mixers.

Samples of each individual exciter signal to be measured are available for use as a down conversion local oscillator. In particular, each of the I and Q channels are mixed with amplitude limited versions of the $F_{min}$ to $F_{max}$ exciter signals, which are sequentially switched-in to the mixer, one signal at a time.

Frequency selectivity is obtained by low pass filtering (LPF) the non-synchronous portion of the detected output. The RF gain control can be calibrated to obtain an absolute power reading, and the low pass filters are set below minimum signal spacing. The I and Q outputs of the low pass filters are then provided back to the multi-signal exciter, thereby providing a leveling loop for phase and/or amplitude error correction of the exciter signals. Note that in alternative embodiments, the signal phase can be controlled using a conventional true time delay (TDD) method. In this case, only amplitude error correction of the exciter signals would be performed.

Figure 3:
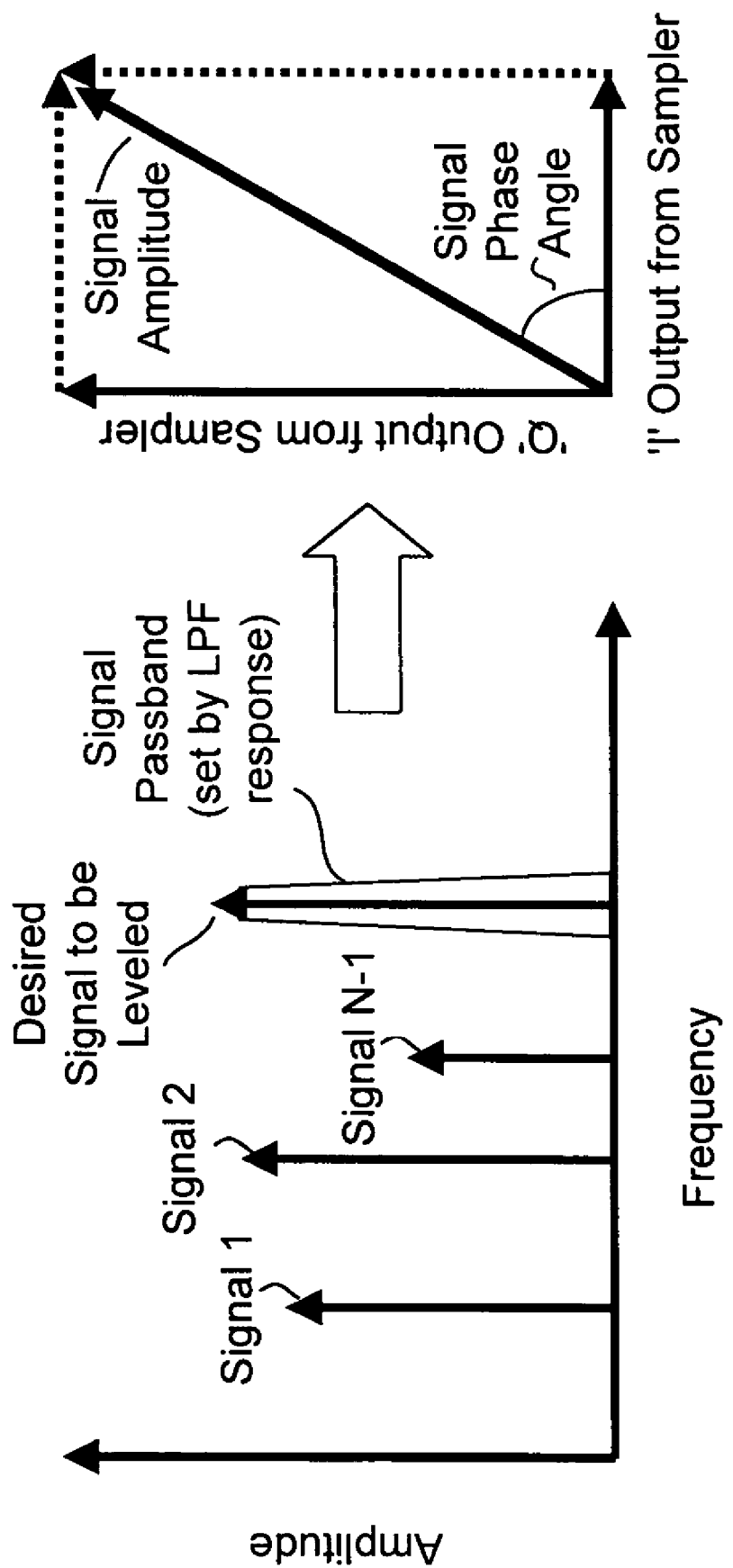
FIG. 3 shows a spectrum of multiple signals amplified by a single RF element amplifier, and the resultant output from an I/Q phase and amplitude sensor configured in accordance with an embodiment of the present invention. The sensor is also referred to herein as an RF sampler.

FIG. 3 shows a spectrum of multiple signals amplified by a single RF element amplifier, and the resultant output from an I/Q phase and amplitude sensor configured in accordance with an embodiment of the present invention. Exciter signals 1 through N are shown as being received and amplified, with signal N being the desired signal to be leveled. Note the varying amplitudes/levels of the signals. The signal pass band of the low pass filter (LPF) selects which of the detected signals will be passed to the I and Q outputs. Further note that the I and Q outputs from the sensor define the detected signals amplitude and phase angle.

A signal distribution manifold within the phased array antenna structure can be used to ensure that the relative phase of the signal between each element is repeatable. This leveling loop measures one signal at a time using an exciter signal sample multiplexer and limiter module that sequentially provides a limited amplitude sample of each exciter signal source.

Selective Leveling Loop Architecture

Figure 4:
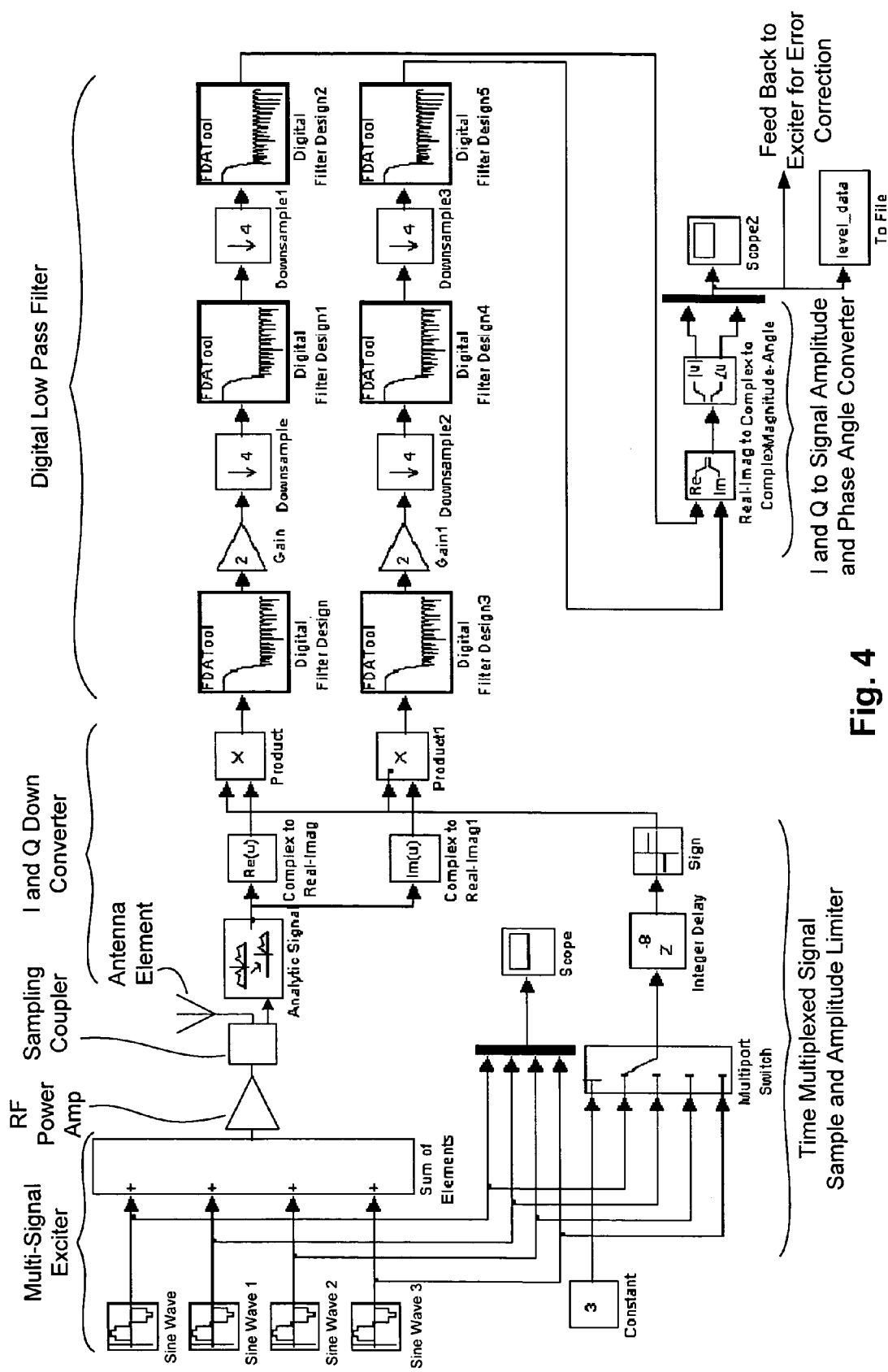
FIG. 4 below is a mathematical representation of a multi-signal frequency selective leveling loop system configured in accordance with one embodiment of the present invention.

FIG. 4 below is a mathematical representation of a multi-signal frequency selective leveling loop system configured in accordance with one embodiment of the present invention.

The system includes a multi-signal exciter, a time multiplexed signal sample and amplitude limiter, an RF power amplifier, a sampling coupler, an I and Q down converter, a digital low pass filter, and an I and Q to signal amplitude and phase angle converter. Note that the leveling loop is operatively connected to an antenna element of a phased array using the sampling coupler. When operated in tandem with other such structures to form an array, an independent beam can be formed and steered for each signal.

In this particular embodiment, a conventional multi-signal exciter is used that includes four independent exciter signal sources having different frequencies (sine wave, sine wave1, sine wave2, and sine wave3). Other embodiments may have different numbers of exciter signals. In this case, the four exciter signals are summed (sum of elements module) to form a composite signal. The composite signal is then amplified by a conventional wideband RF power amplifier.

A conventional sampling coupler is located at the antenna feed point and allows for the amplified composite signal to be provided to the antenna element, and takes a sample of the composite signal. In this particular embodiment, the RF power amplifier and the sampling coupler have a net gain of 0 dB (e.g., amplifier gain of 60 dB and a sampling coupler gain of −60 dB). The sampled composite signal output by the sampling coupler is then provided to the I and Q down converter, which performs I and Q down conversion to DC.

The I and Q down converter converts the sampled composite signal to I and Q signals (analytic signal module, complex to real-imag and complex to real-imag1 modules). The I and Q signals are then separately mixed (product and product1 modules) with a sample of one of the exciter signals. This conversion can be carried out, for example, using conventional analog mixers and a 90° hybrid as shown in FIG. 2. However, other such conventional or custom conversion schemes can be used here as well, with passive or active circuitry.

Samples of each of exciter signal are provided by the time multiplexed signal sample and limiter, which includes a multiport switch, integer delay (representing the time delay of a transmission line of arbitrary length), and sign function that can be implemented with a conventional RF amplitude limiter, where the output is +1 in response to a positive impulse signal input to the sign module, or is −1 in response to a negative input impulse signal. An oscilloscope and coupling switch are in the time multiplexed signal sample and limiter are shown for monitoring and diagnostic purposes, but need not be included (as with other diagnostic capability shown in the embodiment of FIG. 4).

The two outputs of the I and Q down converter include a number of AC signals and a DC component representing the I or Q portion of the acquired amplitude and phase information. A digital low pass filter is used to remove the AC signals from the mixer outputs (product and product1 modules) leaving only the DC signals. The low pass filter for each of the I and Q channels includes a number of digital filter design modules (digital filter design, digital filter design1, and digital filter design2 for channel I, and digital filter design3, digital filter design4, and digital filter design5 for channel Q), with gain and downsample modules interspersed therebetween (gain/downsample and downsample1 for channel I, and gain1/downsample2 and downsample3 for channel Q). The filters can be implemented, for instance, with a digital signal processor or other suitable digital processing environment. A conventional analog low pass filter could also be used with appropriate interface signal format conversions.

The filtered I and Q signals are orthogonal vectors that when added as vectors represent the magnitude and phase of the RF signal at the antenna feed point, as illustrated in FIG. 3. The I and Q to signal amplitude and phase angle converter performs this digital conversion from real-imaginary to complex to complex magnitude and phase angle. This amplitude and phase information can then be provided back to the multi-signal exciter for appropriate correction. The low pass filters and the I and Q to signal amplitude and phase angle converter can be implemented, for instance, with a digital signal processor or other suitable digital processing environment.

In any case, a feedback loop to the multi-signal exciter can be provided to monitor the phase and amplitude of each element, thereby allowing for error correction and related functions, such as amplitude leveling and steering of each signal in an independent beam. The calculation of the error correction can be carried out at either the I and Q to signal amplitude and phase angle converter or the multi-signal exciter or in a distinct error correction calculation module.

In one particular embodiment, each of the antenna elements in a given phased array is coupled to a leveling loop as shown in FIG. 4. To form a beam, the relative phase of each signal at the antenna feed point must be known. In order to obtain this measurement, the electrical length of the transmission line carrying the exciter sample to each down conversion mixer must be known so that its effect can be compensated mathematically. Note, however, that the various transmission lines for carrying the exciter samples to their respective down conversion mixers need not be equal or otherwise matched.

Figure 5:
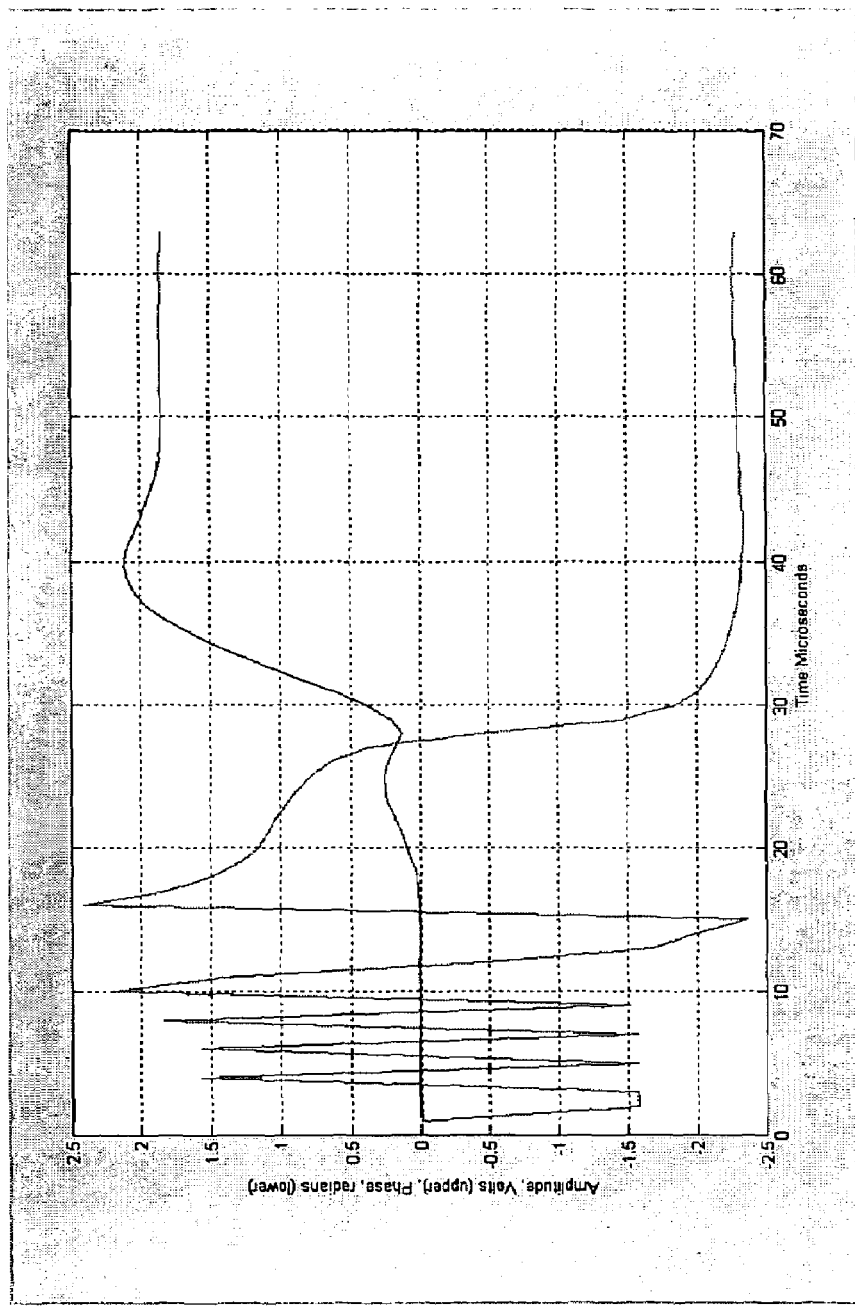
FIG. 5 is an example of a phase and amplitude measurement of a single signal in the presence of others, in accordance with an embodiment of the present invention.

FIG. 5 is an example of a phase and amplitude measurement of a single signal in the presence of others, in accordance with an embodiment of the present invention. In this example, the architecture of FIG. 4 was operated on a single signal.

At time zero microseconds and up to a point at about 20 microseconds, the DC vectors representing the selected signal have not yet reached the output of the digital low pass filter chain. During this period, signal phase is indeterminate as indicated by the oscillations. By about 45 microseconds an accurate and stable representation of the selected signal is established. In a continuous looping time multiplex operation, the output of the I and Q to signal amplitude and phase angle converter would simply transition from one signal to the next without the first 45 microseconds of no signal time.

By examining the transient response in FIG. 5, it is evident that a settling time of about 25 microseconds is required for an accurate signal measurement. By multiplexing the exciter samples with 25 microsecond dwells, accurate measurements of all signals can be made.

In the example shown in FIG. 4, each of the four signals can be monitored at the rate of four times per millisecond on a continuous basis. This technique and implementation may be extended to any number of signals. The settling time of the signal measurement circuit may be decreased by raising the cut off frequency of the digital low pass filter as far as the spacing between the desired DC component and undesired AC signals permits.

Where two signals are very close together, the digital low pass filter can be reprogrammed to a lower cut off frequency; however, settling to a stable measurement will take proportionally longer. The digital filter implementation for undesired signal rejection is useful because it may be set at any time for optimum overall performance without a hardware change. The frequency selective leveling technique may also extended to include pulse type signals where the probability of two signals appearing simultaneously is low and the low pass filter can be made very wide to result in a quick measurement within the duration of each pulse.

Benefits over traditional systems of the frequency selective leveling loop techniques described herein include: the ability to accommodate multi-signal amplifiers; conversion of phase and amplitude information to baseband, thereby eliminating the need of phase matched RF cables; a simple broadband synchronous detector is enabled; and high speed programmable architecture allows fast multiplexing to measure many signals in a short period of time.

The I/Q phase and amplitude sensor and leveling loop architecture can be implemented, for example, as a monolithic integrated chip or chip set, or as a printed wiring board.

Implementation variations will be apparent in light of this disclosure. For example, the reference signal distribution to the individual detectors need not be phase matched but must be known. Also, the low pass filter in FIGS. 2 and 4 can be variable in bandwidth to accommodate more general signal situations, such as wider instantaneous bandwidth signals or more closely spaced signals.

The leveling loop can be further utilized to minimize interaction between signals within the same amplifier. For example, individual signals can be prioritized for amplitude leveling in the event of peak signal overloads. Phase measurement of each signal enables the additional flexibility of steering each signal in an independent beam. In traditional open loop systems, this can not be done easily because of the need for additional calibration and control hardware.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A frequency selective leveling loop device for multi-signal phased array transmitters, comprising:
   a multi-signal exciter adapted to process a plurality of exciter signals and to sum the exciter signals, thereby forming a composite signal;
   an I and Q down converter adapted to convert a sample of the composite signal to I and Q signals, by mixing the composite signal with an amplitude limited exciter signal sample, thereby providing two mixed outputs that each include a number of AC signals and a DC component; and
   a digital low pass filter adapted to remove the AC signals from the mixed outputs leaving only the DC component, thereby enabling at least one of amplitude leveling and steering of each signal in an independent beam.

2. The device of claim 1 further comprising an RF power amplifier adapted to amplify the composite signal.

3. The device of claim 2 further comprising a sampling coupler adapted to provide the amplified composite signal to an antenna element for transmission, and to provide the sample of the composite signal.

4. The device of claim 3 wherein the RF power amplifier and the sampling coupler are configured to provide an overall unity gain.

5. The device of claim 1 further comprising an I and Q to signal amplitude and phase angle converter adapted to convert the DC component to amplitude and phase angle of the composite signal sample.

6. The device of claim 1 further comprising a time multiplexed signal sample and amplitude limiter adapted to sequentially sample exciter signals, thereby providing the amplitude limited exciter signal sample.

7. The device of claim 1 wherein the device is implemented as one of an integrated circuit chip or chip set.

8. The device of claim 1 wherein the low pass filter is variable in bandwidth to accommodate a plurality of signal situations.

9. A frequency selective leveling loop device for multi-signal phased array transmitters, comprising:
   a multi-port exciter adapted to process a plurality of exciter signals and to sum the exciter signals, thereby forming a composite signal;
   an RF power amplifier adapted to amplify the composite signal;
   a sampling coupler adapted to provide the amplified composite signal to an antenna element of the phased array for transmission, and to provide the sample of the composite signal;
   a time multiplexed signal sample and amplitude limiter module adapted to sequentially sample exciter signals, thereby providing an amplitude limited exciter signal sample;
   an I and Q down converter adapted to convert the sample of the composite signal to I and Q signals, by mixing the composite signal with the amplitude limited exciter signal sample, thereby providing two mixed outputs that each include a number of AC signals and a DC component;
   a digital low pass filter adapted to remove the AC signals from the mixed outputs leaving only the DC component; and
   an I and Q to signal amplitude and phase angle converter adapted to convert the DC component to amplitude and phase angle of the composite signal sample, thereby enabling at least one of amplitude leveling and steering of each signal in an independent beam.

10. The device of claim 9 wherein the RF power amplifier and the sampling coupler are configured to provide an overall unity gain.

11. The device of claim 9 wherein the device is implemented as one of an integrated circuit chip or chip set.

12. The device of claim 9 wherein the low pass filter is variable in bandwidth to accommodate a plurality of signal situations.

13. An I/Q phase and amplitude sensor for a frequency selective leveling loop for multi-signal phased array transmitters, the sensor comprising: an I and Q down converter adapted to convert a sample of a composite signal including a number of exciter signals to I and Q signals, by mixing the composite signal with an amplitude limited exciter signal sample, thereby providing two mixed outputs that each include a number of AC signals and a DC component; wherein the composite signal is provided by a multi-signal exciter adapted to process a plurality of exciter signals and to sum the exciter signals, thereby forming the composite signal; and further comprising a digital low pass filter adapted to remove the AC signals from the mixed outputs leaving only the DC component, thereby enabling at least one of amplitude leveling and steering of each signal in an independent beam.

14. The sensor of claim 13 wherein the composite signal is amplified and provided to an antenna element for transmission.

15. The sensor of claim 13 wherein the low pass filter is variable in bandwidth to accommodate a plurality of signal situations.

16. The sensor of claim 13 further comprising an I and Q to signal amplitude and phase angle converter adapted to convert the DC component to amplitude and phase angle of the composite signal sample.

17. The sensor of claim 13 further comprising a time multiplexed signal sample and amplitude limiter adapted to sequentially sample exciter signals, thereby providing the amplitude limited exciter signal sample.

18. The sensor of claim 13 wherein the sensor is implemented as one of an integrated circuit chip or chip set.

* * * * *